(12) United States Patent
Morimoto et al.

(10) Patent No.: US 7,481,540 B2
(45) Date of Patent: Jan. 27, 2009

(54) PROJECTION DISPLAY DEVICE AND COOLING STRUCTURE

(75) Inventors: Teruyuki Morimoto, Kumagaya (JP); Takeshi Satomi, Konosu (JP); Hideo Kanai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 412 days.

(21) Appl. No.: 11/311,356

(22) Filed: Dec. 20, 2005

(65) Prior Publication Data

US 2006/0146293 A1  Jul. 6, 2006

(30) Foreign Application Priority Data

Jan. 6, 2005  (JP)  ............... 2005-001753

(51) Int. Cl.
*G03B 21/18* (2006.01)
*G03B 21/16* (2006.01)

(52) U.S. Cl. .......................... 353/57; 353/61
(58) Field of Classification Search ................. 353/119, 353/52, 56–61; 348/748
See application file for complete search history.

(56) References Cited

U.S. PATENT DOCUMENTS

| 6,280,038 B1 * | 8/2001 | Fuse et al. ............... 353/57 |
| 6,343,862 B1 | 2/2002 | Sawai et al. ............... 353/33 |
| 2002/0163627 A1 * | 11/2002 | Ohishi et al. ............... 353/58 |
| 2004/0223237 A1 * | 11/2004 | Yanagisawa et al. ........ 359/820 |
| 2004/0263799 A1 * | 12/2004 | Lim ............................ 353/61 |
| 2005/0088628 A1 * | 4/2005 | Gishi et al. ............... 353/57 |

FOREIGN PATENT DOCUMENTS

| JP | 2000-330202 | 11/2000 |
| JP | 2002-189251 | 7/2002 |
| JP | 2002-318423 | 10/2002 |
| JP | 2003-084260 | 3/2003 |
| JP | 2003-337380 | 11/2003 |
| JP | 2003-346547 | 12/2003 |
| TW | 477432 | 2/2002 |
| TW | 573748 | 1/2004 |

OTHER PUBLICATIONS

Taiwanese Office Action dated Jul. 24, 2008 for Appln. No. 094139293.

* cited by examiner

*Primary Examiner*—Hung Henry Nguyen
(74) *Attorney, Agent, or Firm*—Pillsbury Winthrop Shaw Pittman, LLP

(57) ABSTRACT

A display device according to the invention has a passage between an image generation device (DMD) and a lamp, wherein the passage guides airflow to the vicinity of a reflector of the lamp, and, after the airflow cools the DMD, the airflow can further cool heat generated by a filter which converts light from the lamp to an image light corresponding to video signals of R, G, and B, and by a light pipe which uniformalizes the in-plane intensity distribution of light incident to the DMD.

13 Claims, 5 Drawing Sheets

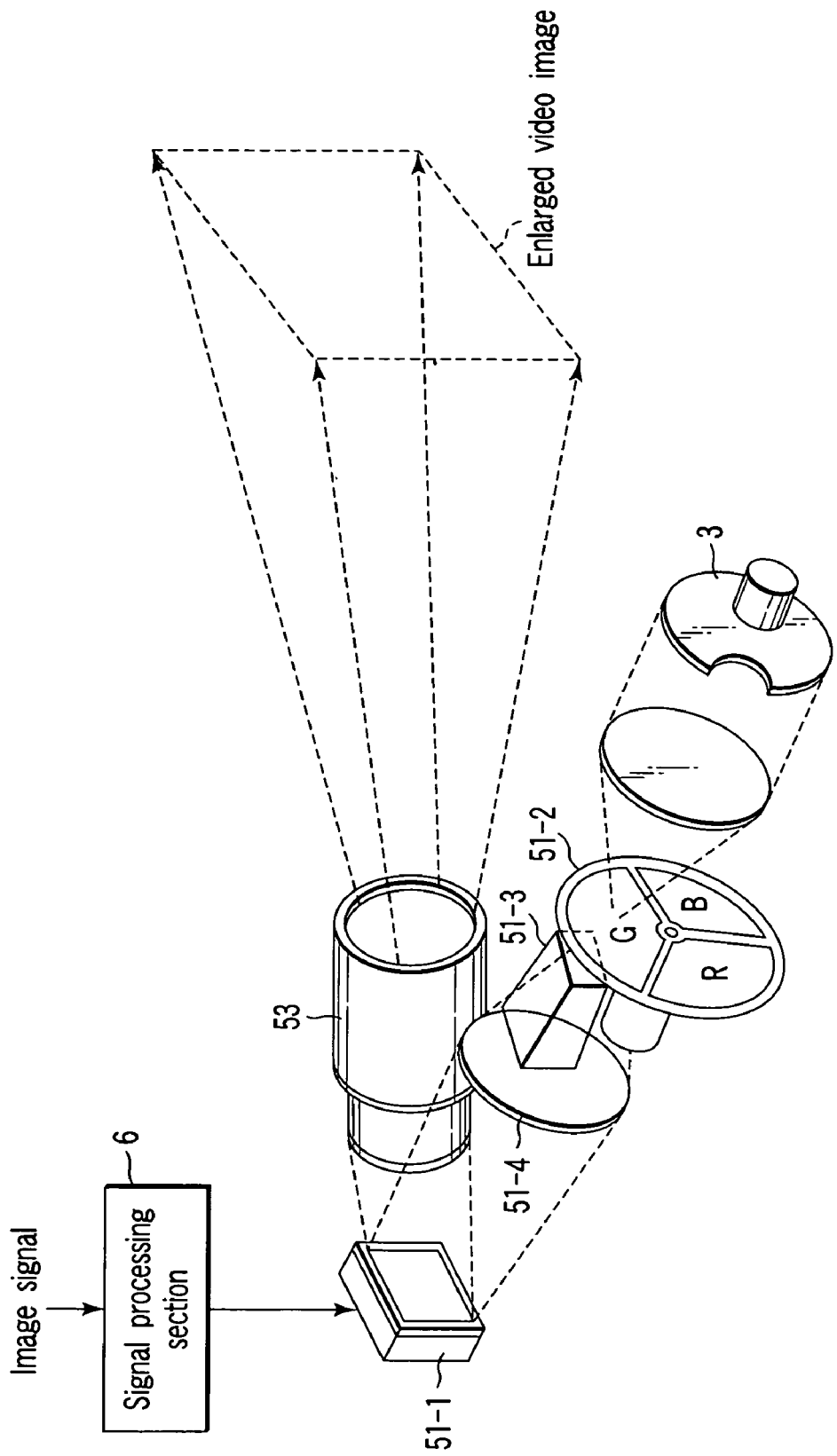
F I G. 5

PROJECTION DISPLAY DEVICE AND COOLING STRUCTURE

CROSS-REFERENCE TO RELATED APPLICATIONS

This application is based upon and claims the benefit of priority from prior Japanese Patent Application No. 2005-001753, filed Jan. 6, 2005, the entire contents of which are incorporated herein by reference.

BACKGROUND OF THE INVENTION

1. Field of the Invention

The present invention relates to a projection-type display device for projecting an image which is generated by an image generating device including a spatial light modulation element, and a cooling structure for the device.

2. Description of the Related Art

A projection-type display device using a digital micromirror device (DMD: trademark) as a spatial light modulation element has been already put into practical use.

In the projection-type display device, spatial modulation of light giving a predetermined color to the light from a light source by using filters of R, G, and B is executed by means of the DMD, and image light obtained by spatial modulation is projected for obtaining a display image.

Recently, a larger light source (a high output light source), and a uniform intensity distribution of light from a light source have been desired in order to meet requirements for increasing the size of a display image at the final step, and for obtaining a sharp image even in a bright room.

However, there has been a problem that uniformalization of light-intensity distribution causes a loss in the intensity of light to be used for the display image at the final step, and the higher output of the light source makes the calorific value increase.

Accordingly, a method in which air flow is supplied to the light source or the vicinity thereof for cooling has been adopted in many cases.

Jpn. Pat. Appln. KOKAI Publication Nos. 2000-330202 and 2002-318423, and U.S. Pat. No. 6,343,862 are well known patent documents disclosing a cooling technique for a projection-type display device.

Jpn. Pat. Appln. KOKAI Publication No. 2000-330202 has disclosed an example in which an airflow by which the optical system is cooled is discharged to the outside after passing through the inside of a power supply case.

Jpn. Pat. Appln. KOKAI Publication No. 2002-318423 has a description of heat dissipation of a light shield plate provided for controlling the influence of dust and the like in a mirror chamber in which an optical element is arranged.

U.S. Pat. No. 6,343,862 has illustrated an example in which, in order to realize the uniform intensity distribution of light from the light source, a light pipe is used.

Jpn. Pat. Appln. KOKAI Publication Nos. 2000-330202 and 2002-318423, which have both described a cooling technology, have not illustrated an optical element which is required to be cooled in a manner independent of that of the light source with a large loss, that is, uniformalization means, though the uniform light-intensity distribution can be realized by the cooling technologies.

U.S. Pat. No. 6,343,862 describes the uniformalization means, but does not refer to cooling.

Here, a cooling method, or a cooling device, which meets the requirements for the uniform light intensity in order to realize a high output light source, and a large display area, cannot be achieved even by combination of the technologies described in the above-described three documents, wherein the high output light source, and the large display area have been currently realized.

BRIEF SUMMARY OF THE INVENTION

An aspect of the present invention provides a display device comprising:

an image creating unit which creates a predetermined color component to light from a light source;

a spatially modulating unit which modulates the light including the predetermined color component, has been given by the image creating unit, according to an image signal;

a projecting unit which projects the light modulated by the spatially modulating unit, to a predetermined position;

a uniformalizing unit which uniformalizes the in-plane intensity of light input into the image creating unit; and a guiding member which guides air guided to the spatially modulating unit is guided to the image creating unit and the uniformalizing unit.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a schematic view explaining a method of displaying an image by using the projection-type display device shown in FIG. 1.

DETAILED DESCRIPTION OF THE INVENTION

Hereinafter, one embodiment according to the present invention will be explained with reference to the accompanying drawings.

Figure 1:
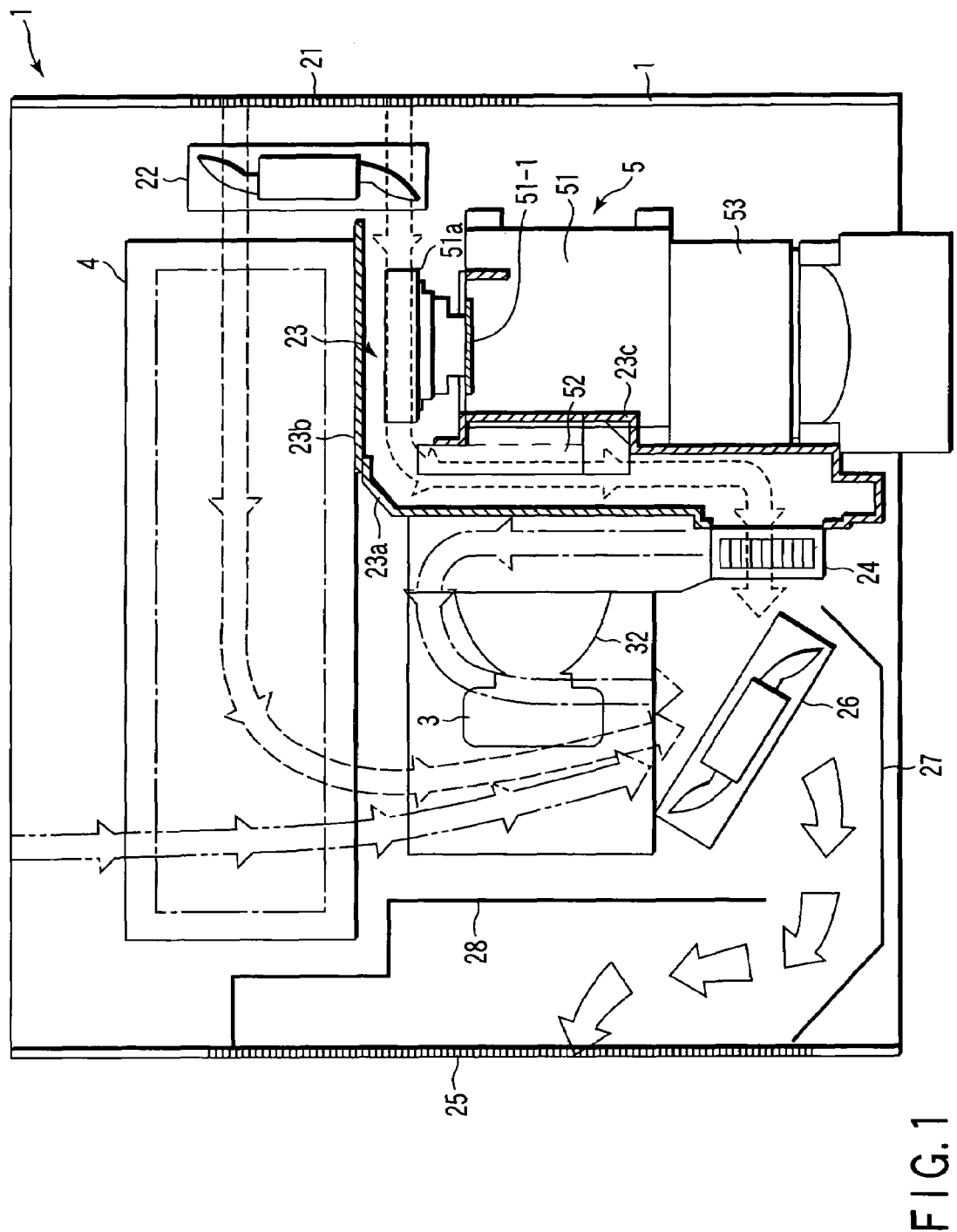
FIG. 1 is a schematic view showing one example of a projection-type display device according to an embodiment of the invention.

FIG. 1 shows one example of a projection-type display device according to an embodiment of the invention.

As shown in FIG. 1 a projection-type display device 1 using a digital micromirror device (DMD) as a spatial light modulation element comprises a housing 2.

A light source 3 which can output white light is provided at a predetermined position of the approximately center of the housing 2. The light source, that is, the lamp box 3 includes, an electric-discharge lamp 31 (refer to FIG. 2) such as, for example, an extra-high pressure mercury vapor lamp, or a xenon lamp; and a reflector 32 by which the surrounding area of the electric-discharge lamp 31 is covered, and, at the same time, light output from the electric-discharge lamp is collected for radiation in a determined direction.

A power supply section 4 including a lighting circuit (lamp driving circuit) which lights the electric-discharge lamp 31 is provided in the vicinity of the lamp box 3. Note that the power supply section 4 is also used as a power supply for individual elements and movable sections to be explained later, and control circuits which are not described in detail.

An image projection section 5, by which image information to be output is generated, and is projected with a predetermined magnification to the outside of the housing 2, is provided at a predetermined position of the housing 2, excluding the positions at which the lamp box 3 and the power supply section 4 are provided.

The image projection section 5 includes: an image generation device 51 for generating image light to be projected on the basis of an image signal; an optical incidence system 52 for guiding light from the electric-discharge lamp 31 in the lamp box 3 to the image generation device 51; and a projection lens system 53 for projecting the image light generated in the image generation device 51 after enlarging.

An intake port 21, which can supply airflow for cooling the power supply section 4 and the image projection section 5 into the inside of the housing, is provided on the side of the housing 2 to which the power supply section 4 and the image projection section 5 are provided nearer. A first fan 22, by which the airflow which flows into the inside of the housing 2 through the intake port 21 is supplied to at least the image projection section 5 in the housing 2, is located between the intake port 21 and a portion in which the power supply section 4 and the image projection section 5 are provided. Note that the first fan 22 is, for example, a common axial-type fan. Obviously, each first fan 22 may be individually provided in the power supply section 4 and the image projection section 5.

A passage 23 for guiding the airflow supplied to the inside of the housing 2 with the first fan 22 to the lamp box 3 through a space between the power supply section 4 and the image projection section 5 is formed between the image projection section 5 and the lamp box 3.

Figure 2:
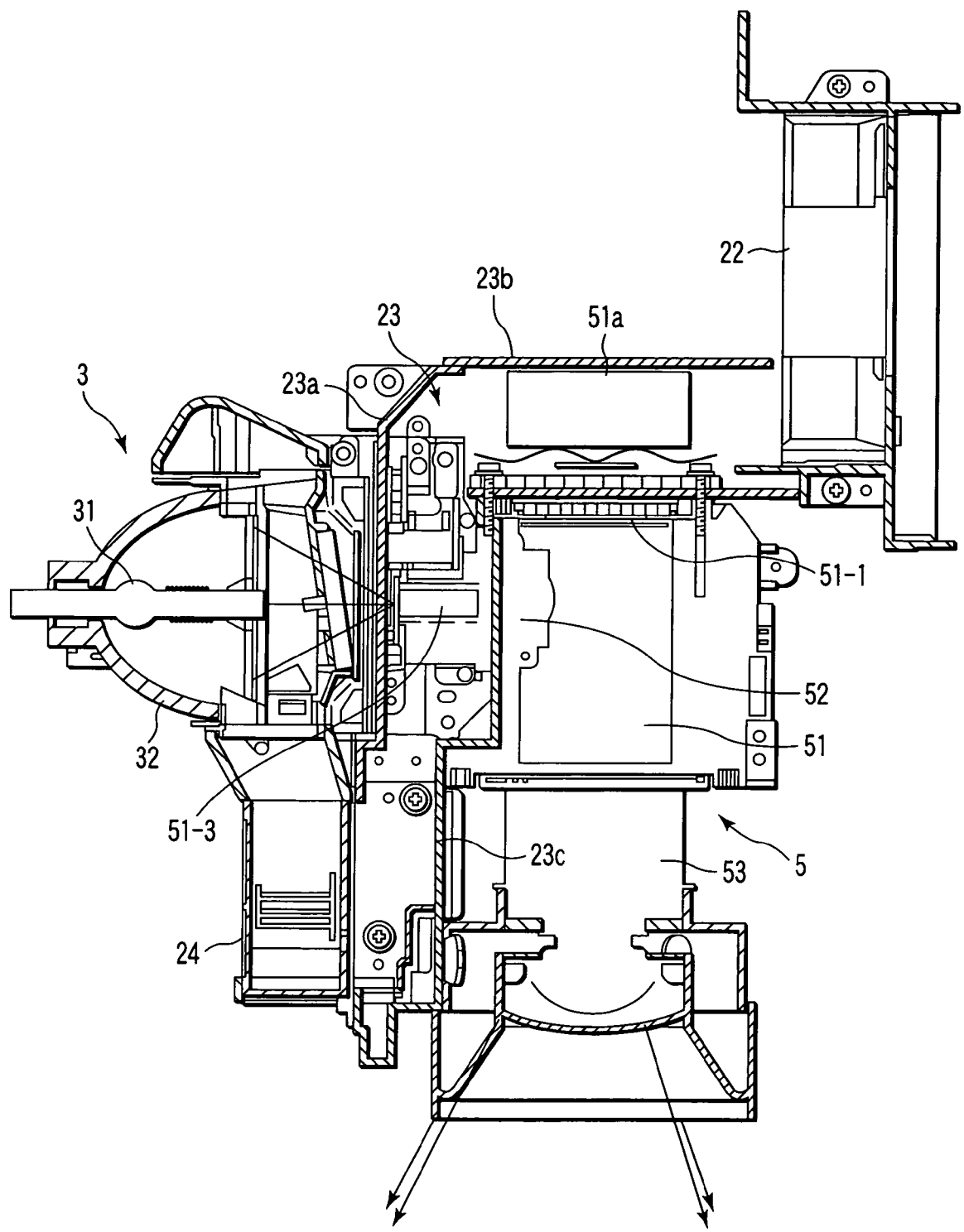
FIG. 2 is a schematic view explaining one example of an airflow passage in the projection-type display device shown in FIG. 1.

As shown in FIG. 2, the passage 23 is defined by first and second duct members 23a and 23b, and a third duct 23c which forms the passage 23 jointly together with the first and the second duct members 23a and 23b. The first and second duct members 23a and 23b lead cooling air taken in from the intake port 21 from the vicinity of a radiating fin 51a (excerpted in part and shown in FIG. 4) provided in the image generation device 51 of the image projection section 5 to a space between the image projection section 5 and the lamp box 3. Moreover, a part of the duct member 23b and that of the exterior (outer wall) of the power supply section 4 are jointly used.

In the passage 23, a second fan 24, which guides the airflow passing through the passage 23 to the inside of the lamp box 3 and the surrounding area thereof, is provided on the side (the exit side, that is, the downstream side of the airflow) opposite to the side nearer to the first fan 22 (the entrance side, that is, the upstream side of the airflow). That is, the airflow (which has already been used for cooling the image generation device 51), which has passed through the passage 23 defined by the duct members 23a and 23b, and the third duct 23c, is supplied to the second fan 24.

The speed and the flow rate of the cooling air (airflow) supplied from the first fan 22 to the second fan 24 can be improved in the most effective manner possible by assuming that the passage 23 between the image generation device 5 and the lamp box 3, that is, the vicinity of the optical incidence system 52 (a light pipe 51-3 and a color filter 51-2 which are explained in FIG. 5) shown in FIG. 2 is an enclosed space which the above-described duct members 23a and 23b can jointly use.

As is evident in FIG. 2, the manufacturability of the duct members is improved by dividing the first and second duct members 23a and 23b into two components at the corner at which the both members are bent at right angles. Note that the number of components is reduced, because a part of the duct member and that of the exterior case of the power supply section are jointly used as described above.

A third fan 26, which delivers the airflow guided through the passage 23 and the lamp box 3, especially, the surrounding area of the reflector 32 and the power supply section 4 to an exhaust port 25 provided at a predetermined position in the housing 2, is provided downstream of the second fan 24. Note that the third fan 26 is, for example, a common axial-type fan. Moreover, straightening vanes 27 and 28, which prevent airflow taken into the third fan 26 from mixing with the airflow discharged to the exhaust port 25, are provided in the vicinity of the third fan 26.

Subsequently, airflow in the housing 2 will be explained.

The airflow drawn into the inside of the housing 2 with the first fan 22 is divided into airflow to the passage 23 and that to the power supply section 4, and, finally, is discharged to the outside of the housing 2 with the third fan 26.

Figure 3:
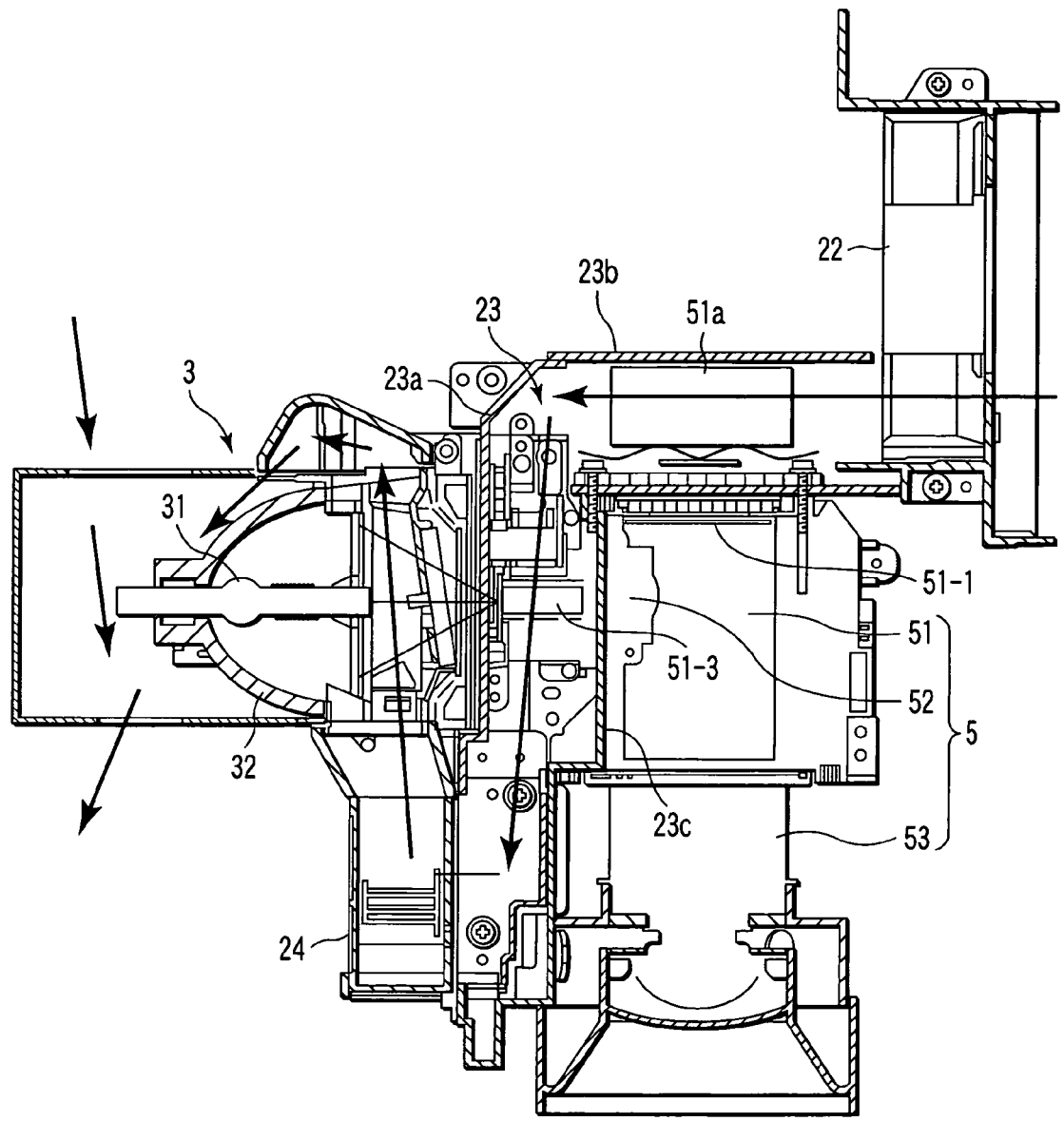
FIG. 3 is a schematic view explaining the most characteristic flow state of airflow in the projection-type display device shown in FIG. 1.

As excerpted in part and shown in FIG. 3, the airflow flowing into the passage 23 is guided through the image generation device 51 with a lower calorific value (less increase in the temperature) than that of the lamp box 3 (the electric-discharge lamp 31), a space between the optical projection system 53 in the image generation device 51 and the lamp box 3 (the light pipe 51-3 (refer to FIG. 5), and the color filter 51-2 (refer to FIG. 5)), and the inside of the lamp box 3 with the highest calorific value, in this order. Subsequently, the airflow is delivered to the outside of the housing 2 with the third fan 26.

In other words, the airflow flowing through the passage 23 can cool elements (cooling object) in the increasing order of heat resistance (set temperature). This means that the airflow (cooling air) of an already higher temperature can be prevented from being supplied to a cooling object with a lower allowable temperature limit, and various kinds of elements arranged inside the housing 2 (element to be cooled) can be efficiently cooled. That is, the temperature of a cooling object with a lower set temperature can be prevented from undesirably rising, wherein this rising is caused by the cooling air with the already higher temperature being supplied to the cooling object with a lower set temperature. At the same time, the cooling air with an extra cooling capacity can be used for cooling an element with the highest allowable temperature (the highest calorific value) before the cooling air is discharged to the outside of the housing 2. Accordingly, the cooling efficiency is further improved.

Here, the above can be expressed as follows in relation to the allowable temperature (set temperature) of a cooling object (an element to be cooled) though the present example is only one example, an image generation device (DMD) 51, and a light pipe, i.e., a lamp box (light source) 3.

The second fan 24 located between the passage 23 and the lamp box 3 is, for example, a sirocco fan (centrifugal multi-blade fan), and discharges most of the airflow guided through the passage 23 to the side (in a direction orthogonal to an axis of rotation (not shown)) of the lamp box 3. That is, the airflow which has cooled the image generation device 51 is continuously used for cooling the lamp box 3, especially, the reflector 32.

The airflow (axial flow) guided along the axis of the second fan 24 is discharged as it is to the outside of the housing 2 with the third fan 26.

The airflow, which is introduced into the inside of the housing through the intake port 21, and is flown into the power supply section 4 is used for cooling the power supply section 4, and, subsequently, is used for cooling the inside of the lamp box 3. Accordingly, the airflow which has cooled the power supply section 4 is continuously used for cooling the inside of the lamp box 3. Even in this case, the cooling air, which has cooled the power supply section 4 with less increase in the temperature (a lower calorific value) than the lamp box (light source 3), can be used for cooling an element with the highest allowable temperature (the highest calorific value) before the cooling air is discharged to the outside of the housing 2. Accordingly, the cooling efficiency is further improved.

Here, new airflow (the course of the airflow is shown with an arrow in FIG. 1) which is taken in with the third fan 26 for cooling the power supply section 4 and the lamp box 3 independently of the airflow taken into the inside of the housing 2 with the first fan 22, may be secured by adding an intake port on the side of the housing 2 facing the power supply section 4. The cooling efficiency can be further improved by adopting a push-pull method in a cooling system using an intake fan and an exhaust fan, and obviously, the method can be also applied to the present invention.

Figure 4:
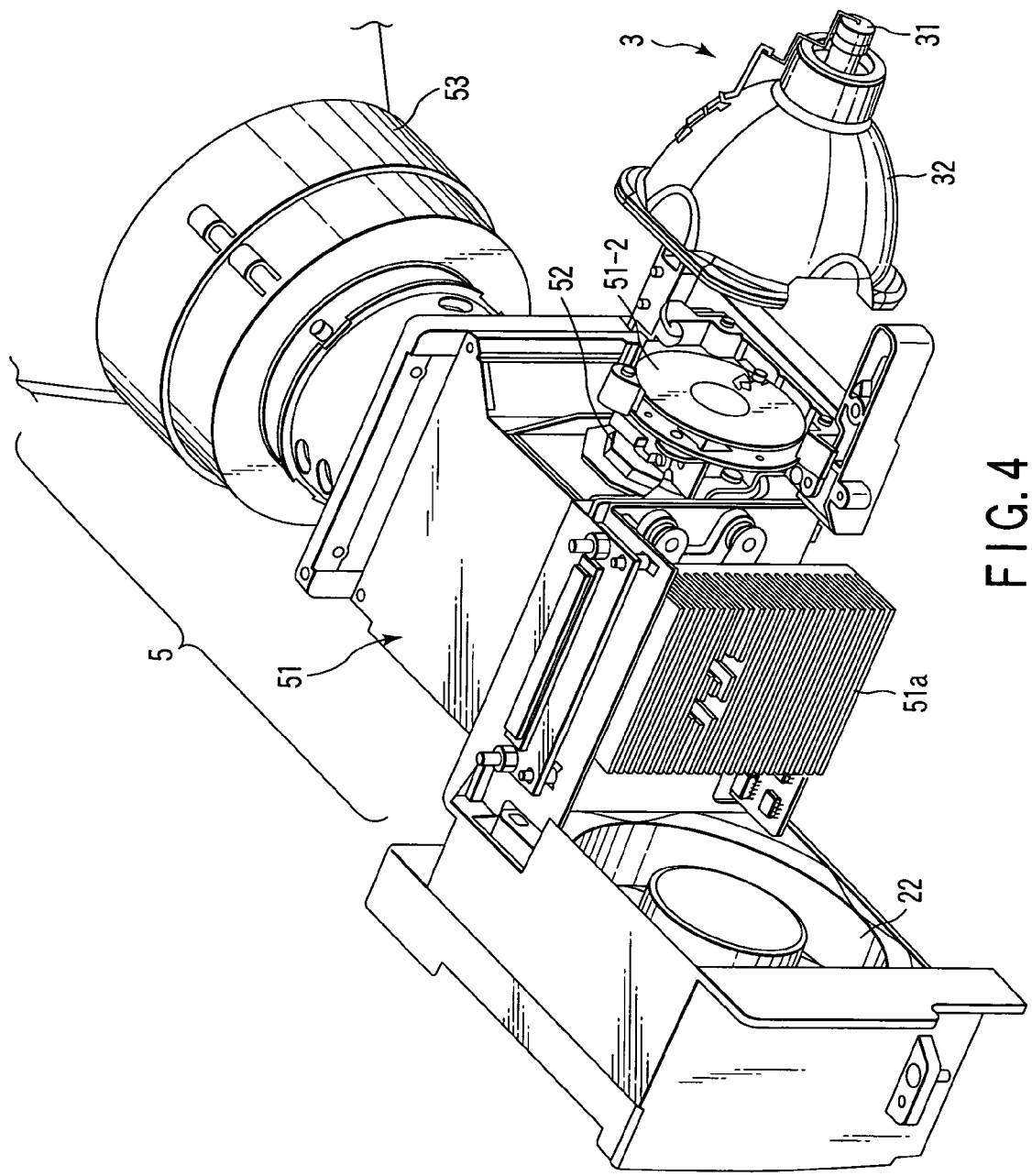
FIG. 4 is a schematic view explaining an element which is cooled first in the airflow passage of the projection-type display device shown in FIG. 1.

FIG. 5 shows one example of a method of displaying an image by use of the image generation device shown in FIG. 1 (or, FIG. 4). One example of an opaque-projector-type display device adopting DMD as the image generation device in FIG. 5 will next be explained.

In the image generation device 51, light supplied from the electric-discharge lamp 31 in the lamp box 3 through the optical incidence system 52 is spatially modulated by video signals supplied from the outside for output to the optical projection system 53. For example, a digital micromirror device (hereinafter, called DMD) 51-1 can be used as the image generation device 51.

When the image generation device 51 is, for example, DMD 51-1, the color filter 51-2 is provided between the electric-discharge lamp 31 and the DMD 51-1. The color filter 51-2 intercepts a predetermined color component of white light in a predetermined order, corresponding to video signals of R, G, and B. Moreover, an optical uniformalization system 51-3 for uniformalizing the in-plane intensity distribution of white light radiated onto the color filter 51-2 is provided between the DMD 51-1 and the color filter 51-2. Preferably, the optical uniformalization system 51-3 is a light pipe, i.e., kaleidoscope or the like.

Note that the wave front of light guided into the inside of the light pipe 51-3 is divided into an arbitrary number of pieces, for example, in a mosaic pattern to realize a uniform in-plane intensity distribution, and a center (peak) is caused at a specific position on the wave front of light which has passed through the color filter 51-2. Accordingly, it can be prevented from becoming dark (more reduced in the light intensity) with distance from the center in a round ring. That is, it can be realized, by using the light pipe, that it becomes less dark at the four corners of a screen after enlargement and projection.

However, it is required to be considered that the heat resistance (set temperature) cannot be completely secured because the light pipe has a characteristic structure in which a plurality of mirrors are combined so that incident light is dispersed into a plurality of components, and each component is reflected in an arbitrary direction.

The optical projection system 53 will not be described in detail, but any enlargement and projection system in which the size of an aberration component, such as field curvature, caused at projection is controlled within a predetermined range, can use various kinds of well-known forms and methods. Note that the optical projection system 53 may have a configuration in which one or more mirrors are used as one unit in order to decrease the distance (the size of the lens) to the lens surface directed towards the outside of the housing 2 in a state in which the system is related the right and left direction and the up and down direction of an image generated with the DMD 51-1, and/or the optical length to the final stage lens is maintained.

More specifically, white light from the electric-discharge lamp 31 in the light source, that is, the lamp box 3 is radiated onto an arbitrary color filter (R, G, and B) of the color filter 51-2, and into the light pipe (optical uniformalization system) 51-3 in the image projection section 5. Note that the color filter 51-2 is rotated with a motor (not shown) at a predetermined speed.

Light (light with a color component of R, G, or B) with uniform light-intensity distribution on the wave front is collected on an image forming surface, which is not described in detail, in the DMD 51-1 through a lens 51-4, wherein the color is obtained after passing through each color filter of the color filter 51-2 and the light pipe 51-3.

The image forming surface includes an arbitrary number of micromirrors arranged in a matrix. The inclination of an individual micromirror is controlled on the basis of video signals supplied through a signal processing section 6. That is, light with a predetermined color given by the color filter 51-2 is reflected in a predetermined direction in accordance with the angles of individual mirrors, wherein the angle of each mirror is controlled on the basis of the video signals. Accordingly, the light reflected according to position information on the image forming surface in a matrix is output as a projection image (output video image) into the optical projection system (enlargement lens system) 53.

Note that a well-known projection-type display device can be easily realized by using a spatial light modulation element of an optical transmission type, for example, a liquid crystal panel for the image generation device, and by changing a positional relation between the lamp box and the optical projection system.

Moreover, in the projection-type display device to which the embodiment of the invention can be applied, a circuit board (not shown) for use in processing of video signals, control of a device, and the like can be cheaply formed without using an element and the like, which are required to be cooled in a special manner, and the above-described route (passage) for cooling air is not required. Nevertheless, when the circuit board is required to be cooled, cooling means can be individually provided.

As explained above, the cooling efficiency of cooling air can be improved in this invention by the configuration in which cooling air taken into the inside of the projection-type display device is guided in the system for cooling an element with a lower allowable temperature limit (cooling object) in the first place, and, then, the cooling air used for cooling the element with a lower allowable temperature limit is guided inside the system in such a manner that an element with a higher allowable temperature limit can be cooled.

The present invention is not limited to the above-described embodiment, and when the invention is executed, various kinds of modifications or changes may be possible without departing from the scope of the present invention. Moreover, individual embodiments may be combined as appropriately as possible for execution, and, in that case, effects produced by such combination may be obtained.

What is claimed is:

1. A display device comprising:
   an image creating unit which creates a predetermined color component to light from a light source;
   a spatially modulating unit which modulates the light, including the predetermined color component provided by the image creating unit, according to an image signal;

a projecting unit which projects the light modulated by the spatially modulating unit, to a predetermined position;

a uniformalizing unit which uniformalizes the in-plane intensity of light input into the image creating unit;

a guiding member which guides air guided to the spatially modulating unit is to the image creating unit and the uniformalizing unit;

a first fan which takes in air from the outside and feeds it into the spatially modulating unit; and a second fan which delivers the air taken in by the first fan and guided through the guiding member, to the outside.

2. The display device according to claim 1, wherein the image creating unit, the spatially modulating unit, the projecting unit, the uniformalizing unit, and the guiding member are contained in a single housing, respectively.

3. The display device according to claim 1, wherein the guiding member is divided with a structure to guide the air, has been guided to the spatially modulating unit, to the image creating unit and the uniformalizing unit.

4. The display device according to claim 3, wherein the air guided through the guiding member from the vicinity of the uniformalizing unit to a heat source with a higher heat resistance than that of the spatially modulating unit.

5. A display device comprising:
an image creating unit which creates a predetermined color component to light from a light source;

a spatially modulating unit which modulates the light including the predetermined color component, has been given by the image creating unit, according to an image signals;

a projecting unit which projecting the light modulated by the spatially modulating unit, to a predetermined position;

a uniformalizing unit which uniformalizes the in-plane intensity of light input into the image creating unit;

a guiding member which guides air guided to the spatially modulating unit is guided to the image creating unit and the uniformalizing unit;

a first fan which takes in air from the outside to feed it into the spatially modulating unit;

a second fan which delivers the air taken in with the first fan and has been guided through the guiding member, to the outside; and a covering member which covers a surrounding area of the light source in such a manner that the air having passed through the guiding member flows into the member, and which cools the light source by the air that has cooled the image creating unit and the uniformalizing unit; wherein the air guided to the guiding member is taken in with the first fan, and the air which is discharged from the guiding member is discharged to the outside with the second fan after the air is fed to the inside of the space defined by the covering member covering the surrounding area of the light source to cool the inside of the space.

6. The display device according to claim 5, wherein the airflow which has passed through a power supplier supplying electric power to use in operation of at least the image creating unit is discharged to the outside after being introduced into a space defined by the covering member covering the surrounding area of the light source, and to cool the space defined by the covering member covering the surrounding area of the light source by the air which has passed through the guiding member and by the air which has passed through the power supplier.

7. The display device according to claim 6, wherein the air passing through the power supplier, and the air guided to the guiding member are taken in with the first fan, and the air discharged from the guiding member is discharged to the outside with the second fan after the air is fed to the inside of the space defined by the covering member covering the surrounding area of the light source to cool the inside of the space.

8. The display device according to claim 7, further comprising:
a third fan which delivers the air has been cooled the inside of the space defined by the covering member covering the surrounding area of the light source, in a predetermined direction.

9. The display device according to claim 6, wherein a part of an exterior member covering the power supplier and a part of a structure through which the air guided to the spatially modulating unit is guided to the image creating unit and the uniformalizing unit are jointly used.

10. The display device according to claim 5, further comprising:
a third fan which delivers the air has been cooled the inside of the space defined by the covering member covering the surrounding area of the light source, in a predetermined direction.

11. A cooling structure comprising:
a first cooling guide which guides air to a first cooling object which is operated at a first set temperature;

a second cooling guide which guides the air to a second cooling object which is operated at a second set temperature higher than the first set temperature;

an airflow guide structure by which the air is guided to the second cooling guide in such a manner that the air, which has been guided to the first cooling guide and has been used for cooling the first cooling object, is used for cooling the second cooling object;

a first fan which guides air taken in from the outside, and feeds the airflow toward the first cooling guide; and a second fan which guides the air, which has been guided with the first fan and has been used for cooling the first cooling obiect through the first cooling guide and the second cooling obiect through the second cooling guide, to the outside.

12. The cooling structure according to claim 11, further comprising:
a second airflow guide structure by which, when there is provided a third cooling object which is operated at a higher third set temperature than the second set temperature, the air, which has passed through the airflow guide structure, is guided to the third cooling object.

13. A cooling structure according to claim 11, further comprising:
an intake fan which takes in outside air;

a first passage which leads cooling air, which has cooled a first cooling object, the first cooling object being cooled by cooling air taken in with the intake fan and being operated at a first set temperature, to a second cooling object which is operated at a higher second set temperature than the first set temperature;

a second passage which leads cooling air, which has been guided to the first passage and has cooled the first cooling object, to a third cooling object which is operated at a higher third set temperature than the second set temperature;

an intermediate fan which delivers the cooling air, which has cooled the second cooling object, to the third cooling object; and an exhaust fan which discharges the cooling air, which has cooled the third cooling object, to the outside.

* * * * *